United States Patent
Kang et al.

(10) Patent No.: US 9,996,205 B2
(45) Date of Patent: Jun. 12, 2018

(54) FLEXIBLE TOUCH SCREEN PANEL

(71) Applicant: Samsung Display Co., Ltd., Yongin-si, Gyeonggi-do (KR)

(72) Inventors: Sung-Ku Kang, Yongin (KR); Tae-Hyeog Jung, Yongin (KR); Hak-Sun Kim, Yongin (KR); Akira Hirai, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days. days.

(21) Appl. No.: 15/356,431

(22) Filed: Nov. 18, 2016

(65) Prior Publication Data

US 2017/0068357 A1 Mar. 9, 2017

Related U.S. Application Data

(63) Continuation of application No. 13/541,207, filed on Jul. 3, 2012.

(30) Foreign Application Priority Data

Apr. 24, 2012 (KR) .................. 10-2012-0042628

(51) Int. Cl.
*G06F 3/044* (2006.01)
*B05D 5/06* (2006.01)
(Continued)

(52) U.S. Cl.
CPC .............. *G06F 3/044* (2013.01); *B05D 5/06* (2013.01); *B05D 7/54* (2013.01); *G02B 1/10* (2013.01);
(Continued)

(58) Field of Classification Search
CPC ........................................... G06F 2203/04102
See application file for complete search history.

(56) References Cited

U.S. PATENT DOCUMENTS 6,020,945 A * 2/2000 Sawai ................. G02F 1/13338
345/104
6,399,166 B1 6/2002 Khan et al.
(Continued)

FOREIGN PATENT DOCUMENTS

JP 2006-285332 A 10/2006
KR 10-2006-0036379 A 4/2006
(Continued)

OTHER PUBLICATIONS

Korean Office Action dated Apr. 12, 2018 for Korean Patent Application No. KR 10-2012-0042628.

*Primary Examiner* — Amare Mengistu
*Assistant Examiner* — Sarvesh J Nadkarni
(74) *Attorney, Agent, or Firm* — Knobbe Martens Olson & Bear LLP

(57) ABSTRACT

In a flexible touch screen panel, sensing patterns as a touch sensor are formed on the first surface of a flexible thin film substrate and a coated polarizer layer is formed on the second surface of the thin film substrate to secure the flexible characteristic, to reduce the thickness of the touch screen panel, and to improve the visibility of an image. Particularly, the flexible touch screen panel includes a flexible substrate comprising an active region and a non-active region positioned outside the active region, sensing patterns formed over the active region of a first surface of the substrate, conductive lines formed over the non-active region of the first surface of the substrate and connected to the sensing patterns, and a coated polarizer layer formed over a second surface of the substrate.

17 Claims, 2 Drawing Sheets

(51) Int. Cl.
   *B05D 7/00*    (2006.01)
   *G02B 1/10*    (2015.01)
   *G02B 5/30*    (2006.01)
   *G06F 3/041*   (2006.01)
   *G02B 1/08*    (2006.01)

(52) U.S. Cl.
   CPC ......... *G02B 5/3033* (2013.01); *G02B 5/3083* (2013.01); *G06F 3/0412* (2013.01); *G02B 1/08* (2013.01); *G06F 2203/04102* (2013.01); *G06F 2203/04103* (2013.01)

(56) References Cited

U.S. PATENT DOCUMENTS

| | | | | |
|---|---|---|---|---|
| 6,483,498 | B1* | 11/2002 | Colgan | G06F 3/045 178/18.05 |
| 6,781,642 | B2* | 8/2004 | Nakanishi | G02F 1/13338 345/104 |
| 8,508,496 | B2* | 8/2013 | Kuo | G06F 3/0412 345/174 |
| 2004/0075779 | A1* | 4/2004 | Paukshto | G02F 1/13338 349/12 |
| 2007/0085838 | A1* | 4/2007 | Ricks | G06F 3/0412 345/173 |
| 2009/0097261 | A1* | 4/2009 | Hsieh | G02B 5/0215 362/355 |
| 2009/0153516 | A1* | 6/2009 | Liu | G06F 3/045 345/173 |
| 2009/0153520 | A1* | 6/2009 | Jiang | G06F 3/045 345/174 |
| 2010/0007625 | A1* | 1/2010 | Jiang | G06F 3/0414 345/173 |
| 2010/0110041 | A1* | 5/2010 | Jang | G06F 3/0412 345/174 |
| 2010/0134448 | A1* | 6/2010 | Park | G06F 3/0412 345/176 |
| 2010/0321327 | A1* | 12/2010 | Liu | G02F 1/13338 345/174 |
| 2011/0007005 | A1* | 1/2011 | Lee | G06F 3/047 345/173 |
| 2011/0012845 | A1* | 1/2011 | Rothkopf | G06F 3/044 345/173 |
| 2011/0141409 | A1* | 6/2011 | Ashida | G02B 5/3033 349/96 |
| 2011/0285641 | A1* | 11/2011 | Huang | G06F 3/0412 345/173 |
| 2011/0304579 | A1* | 12/2011 | Feng | G06F 3/044 345/174 |
| 2012/0056211 | A1* | 3/2012 | Kitagawa | B29C 55/026 257/88 |
| 2012/0147467 | A1* | 6/2012 | Park | G06F 3/0412 359/488.01 |

FOREIGN PATENT DOCUMENTS

| KR | 10-2006-0054806 A | 5/2006 |
|---|---|---|
| KR | 10-2009-0054213 A | 5/2009 |
| KR | 10-2012-0012746 A | 2/2012 |

\* cited by examiner

FLEXIBLE TOUCH SCREEN PANEL

CROSS-REFERENCE TO RELATED APPLICATION

This application is a continuation of U.S. patent application Ser. No. 13/541,207, filed Jul. 3, 2012, which claims priority under 35 U.S.C. § 119 to Korean Patent Application No. 10-2012-0042628, filed on Apr. 24, 2012, in the Korean Intellectual Property Office, the disclosures of which are incorporated by reference herein in their entireties.

BACKGROUND

Field

The present disclosure relates to a touch screen panel, and more particularly, to a flexible touch screen panel.

Description of the Related Technology

A touch screen panel is an input device capable of selecting the indication content or icons displayed on the screen of an image display device by a human hand or an object to input the command of a user.

Generally, the touch screen panel is provided over the entire surface of the image display device to generate an electric signal indicative of a contact position of a human hand or an object. Therefore, the instruction contact selected in the contact position is received as an input signal.

Since the touch screen panel may replace other input devices such as a keyboard or a mouse, which can be coupled to the image display device, the use range is gradually increasing.

Generally, there are resistance layer type touch screen panels, photo-sensing type touch screen panels, and electrostatic capacitive type touch screen panels. Among the above types of touch screen panels, the electrostatic capacitive touch screen panel senses a change in capacitance formed by a conductive sense pattern together with another peripheral sense pattern or a ground electrode when the human hand or the object contacts the touch screen panel to generate an electric signal indicative of the contact position.

The touch screen panel is attached to the external surface of an image display device such as a liquid crystal display (LCD) and an organic light emitting display. Therefore, the touch screen panel is required to have high transmittance and small thickness.

SUMMARY OF CERTAIN INVENTIVE ASPECTS

Accordingly, an aspect of the present invention provides a flexible touch screen panel in which sensing patterns as a touch sensor are formed on the first surface of a thin film substrate having a flexible characteristic and a coated polarizer layer is formed on the second surface of the thin film substrate while maintaining the flexible characteristic. This can reduce the thickness of the flexible touch screen panel, and improve the visibility of an image.

One aspect of the present invention provides a flexible touch screen panel, including a flexible substrate comprising an active region and a non-active region positioned outside the active region, sensing patterns formed over the active region of a first surface of the substrate, conductive lines formed over the non-active region of the first surface of the substrate and connected to the sensing patterns, and a coated polarizer layer formed over a second surface of the substrate.

The coated polarizer layer is a thin crystal film polarizer.

The substrate may comprise a phase shift film. The substrate is configured to function as a quarter wave plate (QWP) and comprises a polycarbonate (PC) film, an oriented polypropylene (OPP) film, or a polyvinyl alcohol (PVA) film.

The substrate comprises a plurality of phase shift films to form a lamination structure. The retardation values of at least two of the plurality of phase shift films differ from each other.

The substrate comprises a cast polycarbonate (PC) film or a cyclic polyolefin (COP) film.

The sensing patterns include first sensing cells arranged in a first direction, first coupling lines, each of which electrically connects neighboring two cells among the plurality of first sensing cells, second sensing cells arranged in a second direction, and second coupling lines, each of which electrically connects neighboring two cells among the plurality of second sensing cells.

An insulating layer is interposed between and at an intersection of one of the first coupling lines and one of the second coupling lines. A black matrix is further formed in the non-active region of the first surface of the substrate.

As described above, according to embodiments of the present invention, the coated polarizer layer is formed on the thin film substrate having the flexible characteristic and the sensing patterns as the touch sensor are formed on the bottom surface of the flexible substrate to secure the flexible characteristic, to reduce the thickness of the flexible touch screen panel, and to improve the visibility of an image.

BRIEF DESCRIPTION OF THE DRAWINGS

The accompanying drawings, together with the specification, illustrate embodiments of the present invention, and, together with the description, serve to explain the principles of the present invention.

DETAILED DESCRIPTION OF CERTAIN INVENTIVE EMBODIMENTS

Figure 1:
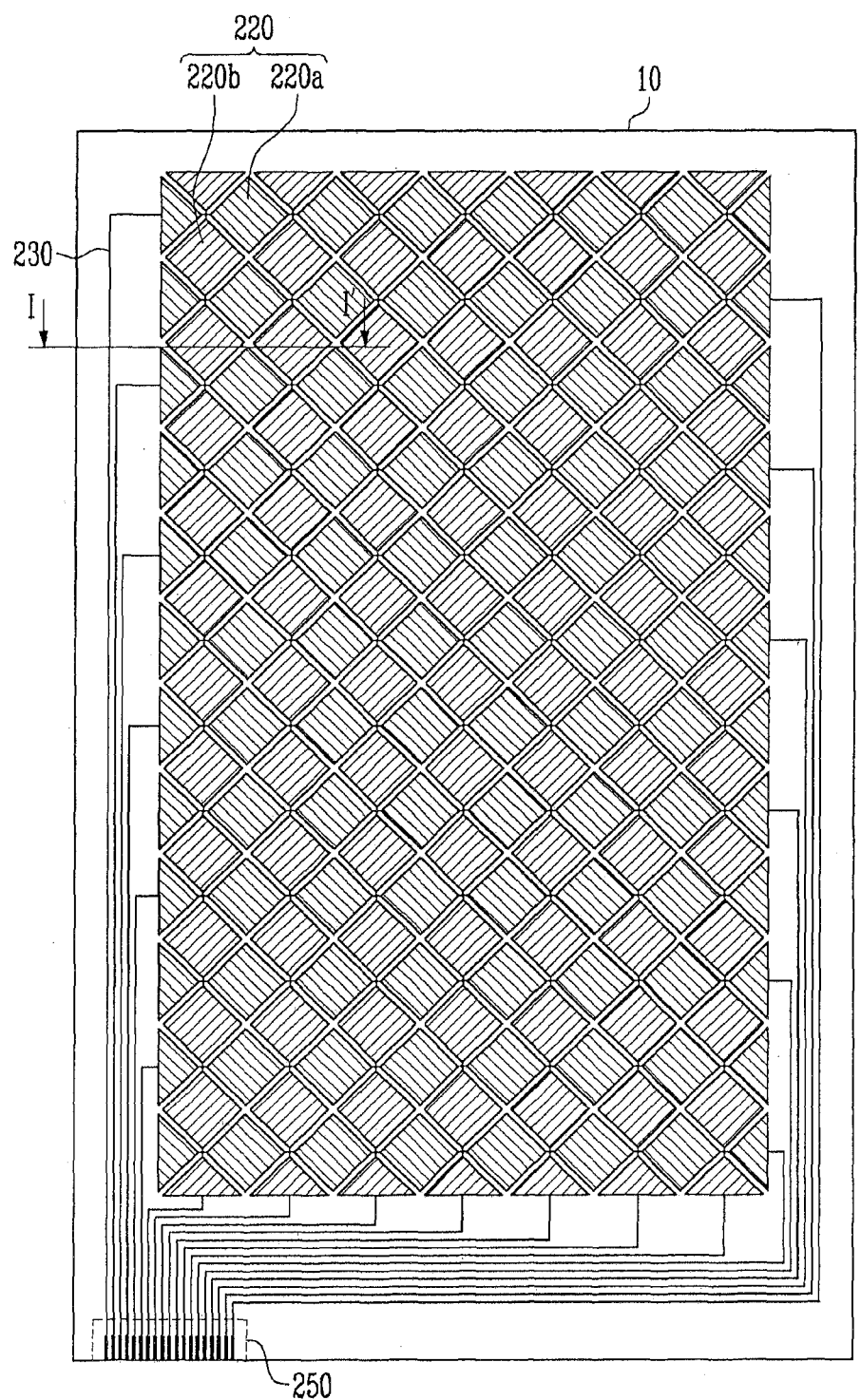
FIG. 1 is a plan view schematically illustrating a touch screen panel according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the element or be indirectly on the element with one or more intervening elements interposed therebetween. Also, when an element is referred to as being "connected to" another element, it can be directly connected to the element or be indirectly connected to the element with one or more intervening elements interposed therebetween. Hereinafter, like reference numerals refer to like elements.

Hereinafter, embodiments of the present invention will be described in detail with reference to the accompanying drawings.

Recently, a flexible image display device is being developed. In this case, the touch screen panel attached onto the flexible image display device is required to be flexible.

Since the electrostatic capacitive touch screen panel requires processes of forming a thin film and a pattern in order to form sensing patterns for realizing a touch sensor, the electrostatic capacitive touch screen panel is required to have high thermal resistance and chemical resistance.

In an example of electrostatic capacitive touch screen panels, sensing patterns are formed on a glass substrate that fits the process characteristics. Since the glass substrate has a thickness greater than a certain thickness to ensure safe transfer in a fabricating process, such glass substrate would not be appropriate for a flexible touch screen panel.

In an example of image display devices, a polarizing plate is attached onto the external surface of the image display device in order to improve outdoor visibility by blocking the reflection of outdoor daylight. When the touch screen panel is attached onto the display panel of the image display device, the polarizing plate may be attached or bonded onto the external surface of the touch screen panel.

The polarizing plate and the touch screen panel is manufactured independently from each other and attached to each other or assembled, for example, by using an adhesive material, and thus, such assembling structure and process of the polarizing plate and the touch screen panel cause increase of the entire thickness of the display device, and reduce production efficiency and yield of the touch screen panel.

Figure 2:
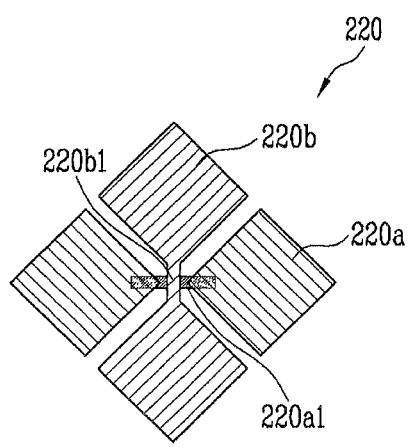
FIG. 2 is an enlarged view of a main part illustrating an example of the sensing pattern illustrated in FIG. 1.

FIG. 1 is a plan view schematically illustrating a touch screen panel according to an embodiment of the present invention. FIG. 2 is an enlarged view of a main part illustrating an example of the sensing pattern illustrated in FIG. 1.

Figure 3:
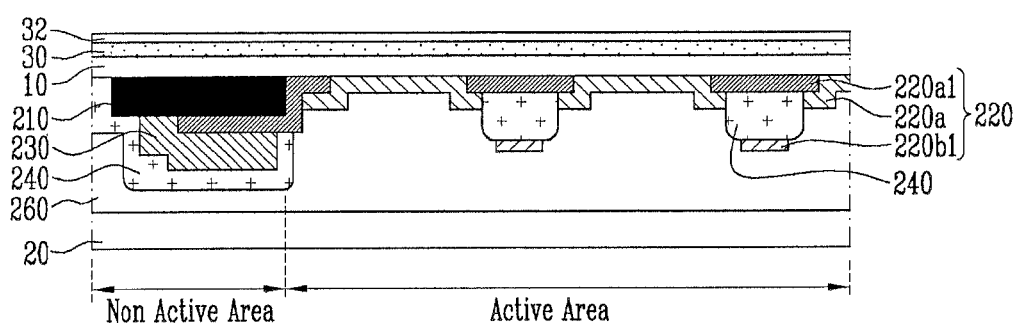
FIG. 3 is a sectional view illustrating a region (I-I') of the touch screen panel according to embodiments of the present invention.

FIG. 3 is a sectional view illustrating a region (I-I') of the touch screen panel according to embodiments of the present invention.

Referring to FIGS. 1 to 3, the touch screen panel according to embodiments of the present invention includes a thin film substrate 10 having a flexible characteristic, sensing patterns 220 formed on a first surface of the thin film substrate 10, and conductive sensing lines 230 for connecting the sensing patterns 220 to an external driving circuit (not shown) through a pad unit 250. A coated polarizer layer 30 is formed on a second surface of the thin film substrate 10 which is opposite to the first surface.

The thin film substrate 10 according to embodiments of the present invention may perform the function of a phase shift film. In embodiments, the thin film substrate 10 may function as a quarter wave plate (QWP) having a phase shift function, and may be formed of a polycarbonate (PC) film, an oriented polypropylene (OPP) film, or a polyvinyl alcohol (PVA) film.

That is, the thin film substrate 10 as the phase shift film provides a phase shift or retardation to light polarized by the coated polarizer layer formed on the second surface to left-circularly polarize or right-circularly polarize incident light and to perform circular polarization or substantial circular polarization.

In addition, in FIG. 3, an embodiment in which the thin film substrate 10 is formed of one layer is illustrated. However, the substrate may be formed of a lamination structure of a plurality of phase shift films. In embodiments, the retardation values of the plurality of phase difference films may be set to vary in order to secure the optimal black characteristic of the light that passes through the coated polarizer layer.

In addition, the thin film substrate 10 according to embodiments of the present invention may be formed of a cast polycarbonate (PC) film or a cyclic polyolefin (COP) film as a material without double refraction other than the phase difference film.

The thin film substrate 10 according to embodiments of the present invention is formed to have thickness of about 0.005 to 0.05 mm regardless of whether the thin film substrate 10 has the phase shift function so that the thin film substrate 10 secure the flexibility.

In addition, according to embodiments of the present invention, the coated polarizer layer 30 is formed on the thin film substrate 10, and thus, the thickness of a polarizer plate may be minimized in comparison with a structure using a pre-formed, separate polarizing plate.

One example of such separate polarizing plate has a three layer structure of triacetyl cellulose (TAC), polyvinyl alcohol (PVA), and TAC. Since the TAC has thickness of about 20 μm and the PVA has thickness of about 80 μm, the separate polarizing plate has the entire thickness of about 180 μm. When the separate polarizing plate is attached to the touch screen panel, the entire thickness of the touch screen panel increases contrary to the trend to make the touch screen panel thin.

According to embodiments of the present invention, in order to realize the function of the polarizer plate and to minimize the thickness of the polarizer plate, as illustrated in FIG. 3, the coated polarizer layer 30 is formed on the second surface, that is, the top surface of the thin film substrate 10. In some embodiments, the coated polarizer layer can be formed by depositing or coating a material for forming a polarizer layer on the thin film substrate. In such embodiments, no adhesive material is interposed between the coated polarizer layer and the thin film substrate as no pre-formed, separate polarizing plate is used.

The coated polarizer layer 30 may be formed in various structures and by using various methods. According to embodiments of the present invention, the coated polarizer layer 30 is formed of a thin crystal film polarizer.

Since the thin crystal film polarizer 30 may have a thickness of or smaller than about 5 μm, in comparison with the above-described case in which the pre-formed, separate polarizing plate is provided, the thickness of the thin crystal film polarizer 30 is significantly reduced.

According to an embodiment, when the thin crystal film polarizer 30 may have a special molecular crystal structure formed as a result of crystallizing a liquid crystal phase when liquid crystal is coated on the thin film substrate and is aligned and dried.

In embodiments, the liquid crystal phase includes at least one organic material capable of forming a stable lyotropic or thermotropic liquid crystal phase. An organic material includes at least one organic compound. In some embodiments, the chemical formula includes (i) at least one ionogenic group that guarantees solubility in polar solvents for obtaining the lyotropic liquid crystal phase, (ii) at least one nonionogenic group that guarantees solubility in non-polar solvents for obtaining the thermotropic liquid crystal phase, and/or (iii) at least one counterion that may be contained or may not be contained in a molecular structure after forming a film.

In embodiments, an optically anisotropic dichroic crystal layer includes a plurality of supramolecular complexes formed of one or a plurality of organic compounds. The supramolecular complexes are deflected in a specific method to provide polarization and electric conductivity of transmitted light.

The layer is formed of rod like supramolecules. The supramolecules include at least one disk shaped polycyclic organic compound having a conjugated π-system. The layer has intermolecular distance of 3.4±0.3 Å along the polarizing axis and entirely has a well ordering crystal structure.

The base material of the optically anisotropic dichroic crystal layer is selected based on the existence of a group such as amine, phenol, and ketone coupled to a conjugated bond system and put on molecular planes and the existence of the developed π conjugated bond system of conjugated aromatic cyclic compounds. Molecules and/or molecular fragments have a flat structure. The base material is, for example, indanthrone (Vat blue 4), 1,4,5,8-parylenetetracarboxylaciddibenzoimidazole (Vat Red 14), 3,4,9,10-parylenetetracarboxylaciddibenzoimidazole, and quinacridone (pigment violet 19). The compound derivatives of the base material may form a stable lyotropic liquid crystal phase.

In the optically anisotropic dichroic crystal layer, the molecular planes are parallel with each other and the molecules form a three dimensional crystal structure at least in the crystal layer part. An optically anisotropic dichroic single crystal layer may be formed by optimizing a manufacturing technology. An optical axis in the single crystal is vertical to the molecular planes. The thin crystal layer has high anisotropy and represents high refractive index and/or high absorption coefficient.

That is, in the touch screen panel according to embodiments of the present invention, as illustrated in FIGS. 1 and 3, the coated polarizer layer 30 is formed on the top surface of the thin film substrate 10 and the sensing patterns 220 and the sensing lines 230 are formed on the bottom surface of the thin film substrate 10. Therefore, the flexible touch screen panel integrated with the polarizer may be realized.

In addition, a functional coating layer 32 may be further formed on the top surface of the coater polarizer layer 30. The functional coating layer may be a hard coating layer, a reflection preventing layer, or contamination preventing layer and a lamination of at least one or two of the above layers.

The structure of the touch screen panel according to embodiments of the present invention will be described hereinbelow.

As illustrated in FIG. 2, the sensing pattern 220 includes a plurality of first sensing cells 220a formed to be coupled to each other in each row line in a row direction, first coupling lines 220a1 for coupling the first sensing cells 220a in the row direction, second sensing cells 220b formed to be coupled to each other in each column line in a column direction, and second coupling lines 220b1 for coupling the second sensing cells 220b in the column direction.

For the sake of convenience, in FIG. 2, only a portion of the sensing patterns is illustrated. However, the touch screen panel has a structure in which the sensing patterns illustrated in FIG. 2 are repetitively arranged.

The first sensing cells 220a and the second sensing cells 220b are alternately arranged not to overlap each other. The first coupling lines 220a1 and the second coupling lines 220b1 intersect each other. An insulating layer (not shown) for securing stability is interposed between the first coupling line 220a1 and the second coupling line 220b1.

In embodiments, the first sensing cells 220a are formed to be integrated with the first coupling lines 220a1 and the second sensing cells 220b are formed to be integrated with the second coupling lines 220b1 using a transparent electrode material such as indium tin oxide (ITO). In other embodiments, the first sensing cells 220a are formed to be separate from the first coupling lines 220a1, and then, electrically coupled to the first coupling lines 220a1. The second sensing cells 220b are formed to be separated from the second coupling lines 220b1, and then, electrically coupled to the second coupling lines 220b1.

For example, the second sensing cells 220b are patterned to be integrated with the second coupling lines 220b1 in a column direction and the first sensing cells 220a are patterned between the second sensing cells 220b to have independent patterns and may be coupled to each other by the first coupling lines 220a1 positioned on or under the first sensing cells 220a in a row direction.

The first coupling lines 220a1 may directly contact the first sensing cells 220a on or under the first sensing cells 220a to be electrically coupled to the first sensing cells 220a or may be electrically coupled to the first sensing cells 220a through contact holes.

The first coupling lines 220a1 may be formed of a transparent electrode material such as ITO or may be formed of an opaque low resistance metal material so that the width thereof is controlled to prevent the patterns from being visible.

The sensing lines 230 illustrated in FIG. 1 are electrically coupled to the first and second sensing cells 220a and 220b aligned along row and column lines to couple the first and second sensing cells 220a and 220b to an external driving circuit (not shown) such as a position detecting circuit through the pad unit 250.

The sensing lines 230 are arranged in a non-active region positioned outside an active region in which an image is displayed. The choice range of the material of the sensing lines 230 is large so that the sensing lines 230 may be formed of a low resistance metal material such as Mo, Ag, Ti, Cu, Al, and Mo/Al/Mo other than the transparent conductive material used for forming the sensing patterns 220.

When a contact object such as a human hand or a stylus pen contacts the above-described electrostatic capacitive touch screen panel according to embodiments of the present invention, a change in electrostatic capacity caused by contacting at a contact position is transmitted from the sensing patterns 220 to a driving circuit (not shown) via the sensing lines 230 and the pad unit 250. Then, the change in the electrostatic capacity is converted into an electrical signal by an X and Y input processing circuit (not shown) to identify the contact position.

FIG. 3 is a sectional view illustrating parts of the non-active region and the active region of the touch screen panel formed on the first surface of the flexible thin film substrate 10.

The coated polarizer layer 30 is formed on the second surface of the thin film substrate 10 and, as described above, the functional coating layer 32 may be further formed on the coated polarizer layer 30.

In addition, in FIG. 3, a display device 20 is attached, by a transparent adhesive layer 260, to the bottom surface of the touch screen panel such that the first surface of the thin film substrate faces the display device 20. In embodiments, the display device is a flexible display device, which may be an organic light emitting display.

The transparent adhesive layer 260 formed of a transparent adhesive material having high light transmittance may be formed of super-view resin (SVR) or optical cleared adhesive (OCA).

Referring to FIG. 3, the sensing patterns 220 formed on the active region of the first surface of the thin film substrate 10 include the first sensing cells 220a formed to be coupled to each other in each row line in a first direction, the first coupling lines 220a1 for coupling the first sensing cells 220a in a row direction, the second sensing cells 220*b* formed to be coupled to each other in each column line in a column direction, and the second coupling lines 220*b*1 for coupling the second sensing cells 220*b* in a column direction. An insulating layer 240 is interposed between and at the intersection of the first coupling line 220*a*1 and the second coupling line 220*b*1.

In FIG. 3, for the sake of convenience, the thickness of the elements such as the sensing patterns 220 that form the touch screen panel is illustrated to be large. However, the actual thickness of the elements is much smaller.

In addition, as illustrated in FIG. 3, a black matrix 210 and the sensing lines 230 formed to overlap the black matrix 210 and to be electrically coupled to the sensing patterns 220 are formed in the non-active region positioned outside the active region.

At this time, the black matrix 210 prevents the patterns such as the sensing lines formed in the non-active region from being visible and forms the frame of the display region.

In the above-described structure, according to embodiments of the present invention, the touch screen panel is positioned between the display device 20 and the coated polarizer layer 30 to maintain the flexible characteristic, to prevent the sensing patterns from showing through, and to minimize reflectance.

While embodiments of the present invention has been described, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A flexible touch screen panel, comprising:
   a flexible substrate comprising first and second surfaces facing away from each other;
   an array of sensing electrodes and conductive lines provided over the first surface of the flexible substrate;
   a thin crystal film polarizer coated on the second surface of the flexible substrate without an intervening layer between the thin crystal film polarizer and the second surface of the flexible substrate;
   a black matrix disposed between the first surface of the flexible substrate and the conductive lines;
   a transparent adhesive layer covering the array of sensing electrodes and the conductive lines on the first surface of the flexible substrate, and
   a functional coating layer disposed on the thin crystal film polarizer,
   wherein the functional coating layer comprises at least one of: a hard coating layer, a reflection preventing layer and a contamination preventing layer.

2. The flexible touch screen panel as claimed in claim 1, wherein the flexible substrate comprises a phase shift film.

3. The flexible touch screen panel as claimed in claim 2, wherein the flexible substrate is configured to function as a quarter wave plate (QWP).

4. The flexible touch screen panel as claimed in claim 3, wherein the flexible substrate comprises at least one of a polycarbonate (PC) film, an oriented polypropylene (OPP) film, of a polyvinyl alcohol (PVA) film.

5. The flexible touch screen panel as claimed in claim 1, wherein the flexible substrate comprises a plurality of phase shift films to form a lamination structure.

6. The flexible touch screen panel as claimed in claim 5, wherein retardation values of at least two of the plurality of phase shift films differ from each other.

7. The flexible touch screen panel as claimed in claim 1, wherein the flexible substrate comprises a cast polycarbonate (PC) film or a cyclic polyolefin (COP) film.

8. The flexible touch screen panel as claimed in claim 1, wherein the array of sensing electrodes comprise:
   first sensing cells arranged in a first direction;
   first coupling lines, each of which electrically connects neighboring two cells among the plurality of first sensing cells;
   second sensing cells arranged in a second direction; and
   second coupling lines, each of which electrically connects neighboring two cells among the plurality of second sensing cells.

9. The flexible touch screen panel as claimed in claim 8, wherein an insulating layer is interposed between and at an intersection of one of the first coupling lines and one of the second coupling lines.

10. The flexible touch screen panel as claimed in claim 8, wherein the first and second sensing cells are disposed on the same side of the flexible substrate.

11. The flexible touch screen panel as claimed in claim 1, wherein the thin crystal film polarizer has a thickness less than or equal to 5 µm.

12. The flexible touch screen panel as claimed in claim 1, wherein the thin crystal film polarizer is interposed between the flexible substrate and the functional coating layer.

13. The flexible touch screen panel as claimed in claim 1, wherein the flexible substrate comprises an active region including the array of sensing electrodes and a non-active region, wherein the black matrix is formed between the first surface of the flexible substrate and the conductive lines in the non-active region positioned outside of the active region.

14. A flexible touch screen panel, comprising:
   a flexible substrate comprising first and second surfaces facing away from each other;
   an array of sensing electrodes and conductive lines provided over the first surface of the flexible substrate;
   a thin crystal film polarizer coated on the second surface of the flexible substrate without an intervening layer between the thin crystal film polarizer and the second surface of the flexible substrate;
   a black matrix disposed between the first surface of the flexible substrate and the conductive lines;
   a transparent adhesive layer covering the array of sensing electrodes and the conductive lines on the first surface of the flexible substrate, and
   a functional coating layer disposed on the thin crystal film polarizer,
   wherein the thin crystal film polarizer is interposed between the flexible substrate and the functional coating layer,
   wherein the functional coating layer comprises at least one of: a hard coating layer, a reflection preventing layer and a contamination preventing layer.

15. The flexible touch screen panel as claimed in claim 14, wherein the array of sensing electrodes comprise:
   first sensing cells arranged in a first direction;
   first coupling lines, each of which electrically connects neighboring two cells among the plurality of first sensing cells;
   second sensing cells arranged in a second direction; and
   second coupling lines, each of which electrically connects neighboring two cells among the plurality of second sensing cells.

16. The flexible touch screen panel as claimed in claim 15, wherein an insulating layer is interposed between and at an intersection of one of the first coupling lines and one of the second coupling lines.

17. The flexible touch screen panel as claimed in claim 15, wherein the first and second sensing cells are disposed on the same side of the flexible substrate.

* * * * *